Patented Aug. 5, 1952

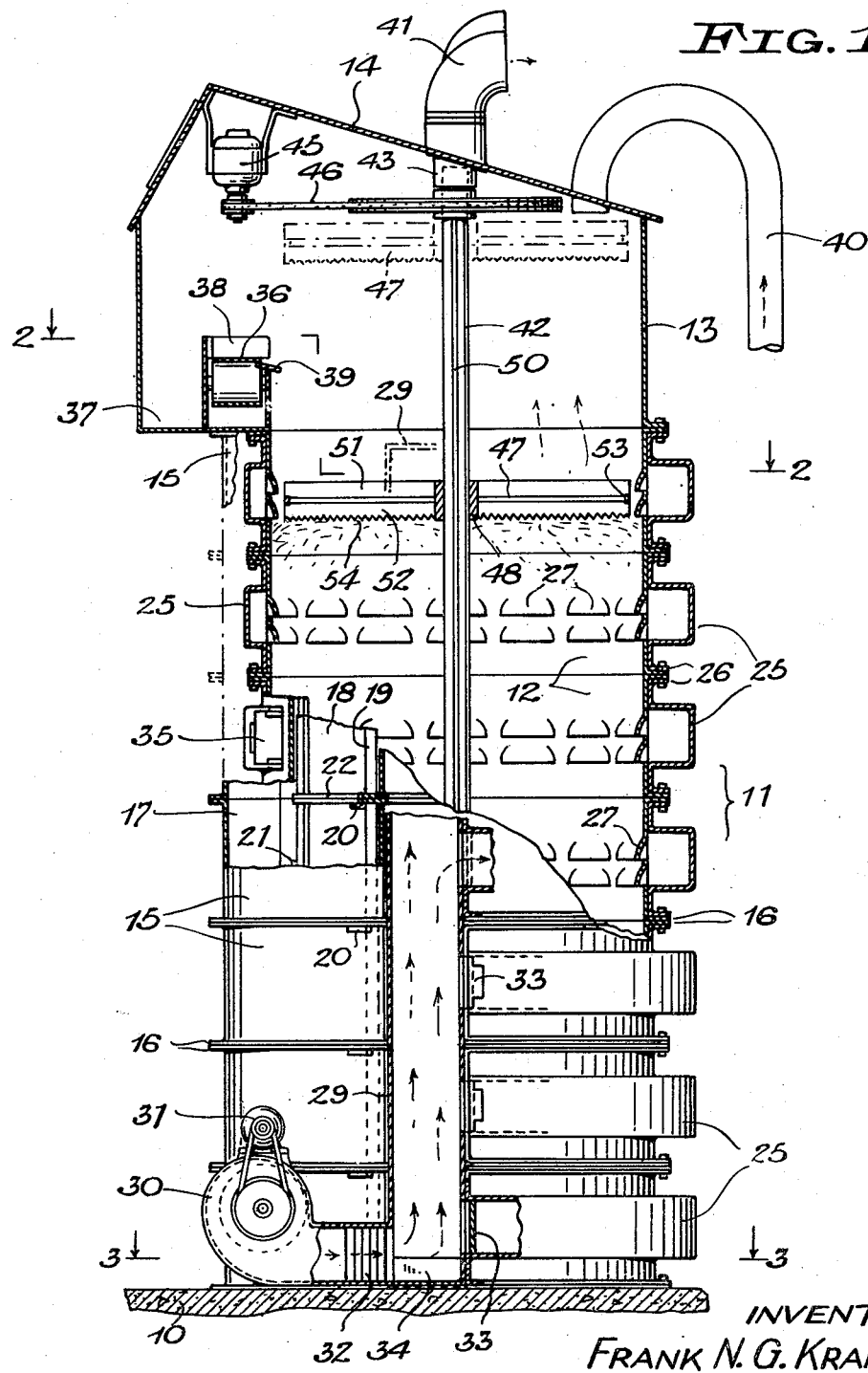

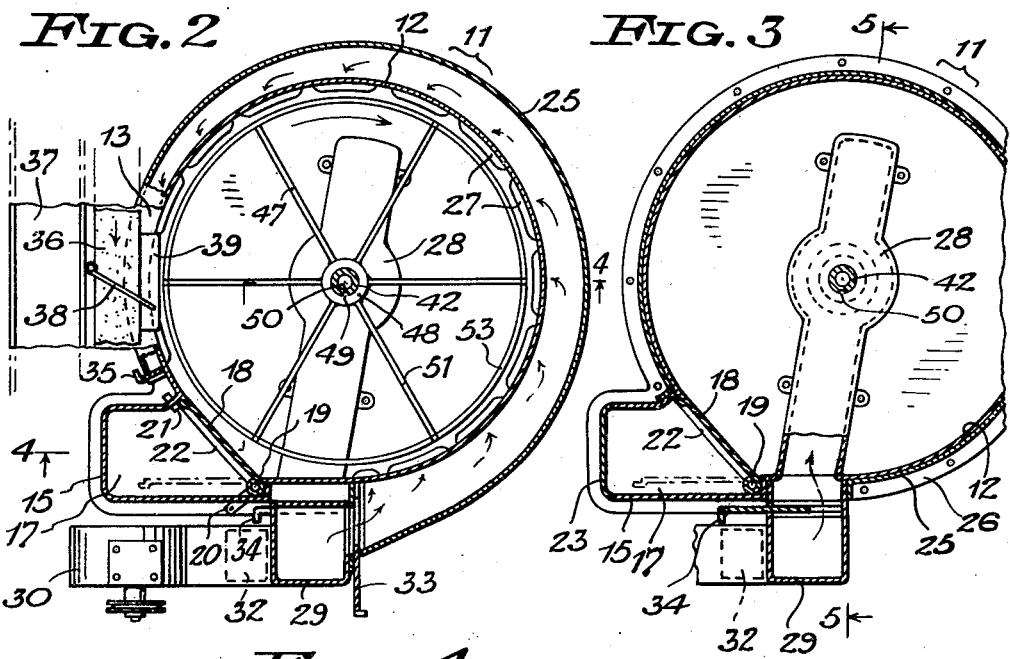
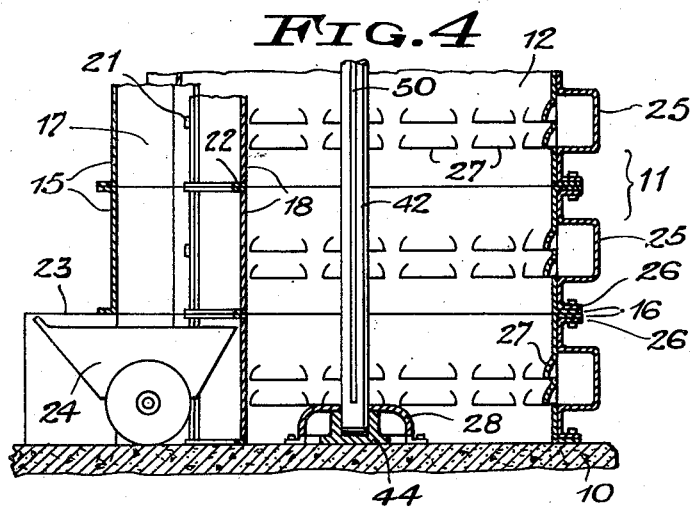
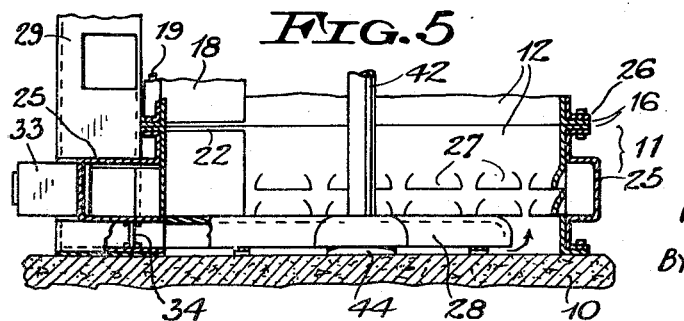

2,605,692

UNITED STATES PATENT OFFICE 2,605,692

APPARATUS FOR STORING FORAGE

Frank N. G. Kranick, Racine, Wis.

Application August 22, 1945, Serial No. 612,008

3 Claims. (Cl. 98—54)

The present invention relates to a method and apparatus for storing forage.

It has heretofore been proposed to dry forage stored in a container by causing air to flow through the stored forage mass. However, the methods and apparatus heretofore devised have been open to various objections, such as insufficient or irregular drying, and relatively large power consumption.

An object of the invention is to provide a method of drying a mass of stored forage which shall afford a good control of the drying operation even though the material is added to the mass from time to time. More specifically, it is an object to provide a forage drying method wherein air or other gaseous drying medium is selectively or locally applied to different levels of the forage mass.

Another object is to provide an improved form of forage storing apparatus for carrying out the method.

Still another object is to provide a forage storing container which shall permit proper drying of the forage regardless of the extent of filling of the container, and which shall effect drying with relatively low power consumption.

A further object is to provide a forage storing apparatus which is of simple and durable construction and which is capable of relatively inexpensive manufacture.

A still further object is to provide a forage container having improved means for loading and unloading the forage.

The invention further consists in the several features hereinafter described and claimed.

In the accompanying drawings,

Fig. 1 is a sectional elevational view of a forage container constructed in accordance with the invention and for carrying out the method of the invention;

Fig. 2 is a transverse sectional view of the container taken generally along the line 2—2 of Fig. 1;

Fig. 3 is another transverse sectional view taken generally along the line 3—3 of Fig. 1;

Fig. 4 is a sectional elevational view of the lower part of the container taken generally along the line 4—4 of Fig. 2, and Fig. 5 is another sectional elevational view of the container taken generally along the line 5—5 of Fig. 3.

In these drawings, 10 designates a suitable base, such as of concrete, and 11 designates generally a vertically elongated storage container for hay or other forage. The container comprises a plurality of superposed casing sections 12 and a top casing section 13 which are rigidly connected together and which define the side walls of the container, the top casing section having a roof 14. The casing sections 12 and 13 are formed of suitable material, such as metal, and the former are of generally annular shape with respective lateral extensions 15, there being outturned peripheral attaching flanges 16 at the abutting edges of the several casing sections. The extensions 15 project tangentially of the casing sections 12, Figs. 2 and 3, and are vertically aligned to form a vertical discharge chute or duct 17. The main body of the container is of cylindrical shape and is separated from the discharge chute 17 by gates or doors 18 on the respective casing sections 12, each gate being swingable on a vertical axis at 19, and there being a suitable operating arm 20 and latch or retainer 21 for each gate. In some instances, the casing sections 12 may be provided with narrow horizontal bars 22 forming partitions between the gate openings. The lowermost casing projection 15 has a door 23, Fig. 4, for the removal of discharged material, as by means of a cart 24 which receives the falling material.

Extending partially around each casing section 12 is an air duct 25, preferably scroll-shaped, with the intake end larger than the closed end, the discharge gate 18 of the casing section intervening between the ends of the duct. Each air duct has outturned peripheral connection flanges 26 which are bolted or otherwise secured to the casing flanges 16. This construction permits attachment and removal of the ducts without dismantling the container or requiring access to the inside of the container. Each casing section 12 is provided in its vertical side wall with a series of horizontal vent slots or louvers 27 for discharging air from the duct 25 into the container, these louvers being so shaped as to minimize entrance of forage material into the duct. A floor duct 28 extends diametrically of the container along the base 10 and has its lower edges spaced from the base for the discharge of air into the container. If desired, the floor duct may have louvers (not shown) like those of the side wall ducts.

The intake ends of the ducts 25 and 28 communicate with a vertical header or pressure stack 29, the lower end of which is connected to a blower 30 driven by a suitable source of power such as an electric motor 31. In some instances, a conditioner 32 for heating or dehumidifying the air, or for both treatments, is placed in the discharge of the blower casing. Instead of air, a heated non-oxidizing gas, such as flue gas, or a mixture of air and gas, may be supplied by the blower. If desired, the blower may serve a plurality of forage containers.

Movable gates or dampers 33 are placed at the intake ends of the respective air ducts 25 for selectively controlling the flow of air through these ducts, and a movable gate or damper 34 is placed at the intake end of the floor duct 28 to control the flow of air through this duct. The small end of each side wall duct 25 is normally closed by a gate or damper 35, Figs. 1 and 2, which when opened will permit any loose material deposited in the duct to be blown out by air pressure in the duct.

The top casing section 13 is provided at one side with a conveyer belt 36 and an operator's platform or catwalk 37. A pivoted gate or deflector 38 extends at an angle across the upper run of the belt for causing forage material on the belt to be discharged into the container, the falling material passing along an inclined chute board 39. If desired, the conveyer belt and catwalk may serve a plurality of forage containers, in which case the pivoted gate 38 provides a selective discharge means, this gate being swung between active and inactive positions. Forage material, especially in the case of light chopped material, may also be fed into the conveyer by blowing it through a feed pipe 40 connected to the top casing section. The roof of the container may be provided with a suitable ventilator 41 which in some instances may be of the eduction type.

A vertical shaft 42 extends centrally in the container and is suitably journalled at its upper and lower ends in bearings 43 and 44. The shaft is driven by any suitable source of power, such as an electric motor 45 having a belt drive connection 46 with the shaft. A light-weight discharging or unloading rotor 47 has a hub 48 slidably but drivingly mounted on the shaft, as by a key projection 49 on the hub fitting in a keyway 50 in the shaft. The rotor is of skeleton form and has upper and lower radial vanes 51 and 52 connected to a circular rim 53, the vanes 51 forming fan blades and the vanes 52 having teeth 54 to loosen the packed forage in the container. The rotor rests lightly on the top of the forage and when rotated in a clockwise direction as viewed in Fig. 2 serves to blow or fan the loosened forage into the tangential discharge extensions 15 of the casing sections, the doors 18 at the discharge level being open during this operation. Since the ducts 25 are at the outer sides of the annular casing sections 12, the rotor periphery can be brought reasonably close to the inner walls of these casing sections. During loading of the container the rotor is held in its uppermost position shown in dotted lines in Fig. 1, as by a block-and-tackle, not shown.

The container 11 serves to store hay, stover or other forage which is delivered into the container by the conveyer belt 36, or in some instances by the feed pipe 40. The forage may have a moisture content which is too high to permit safe storage and in such case the material in the container is dried to an extent permitting safe storage. After forage is deposited in the container to a depth of a few feet, the gate or damper 33 of the lowermost side wall air duct 25, and also the gate or damper 34 of the floor duct, are opened; and the gaseous drying medium (natural air, warmed air, or gas) is delivered to the header or stack 29 by the blower 30 for a sufficient length of time to obtain the desired degree of dryness. As more material is deposited in the container, which may occur at different times during the day, or on different days or even different weeks, and as the material in the lower region of the container is reduced to the desired degree of moisture content, the gates 33 and 34 of the lowermost side wall duct and floor duct are closed, and a gate of a higher side wall duct is opened, permitting drying air to be forced through the upper material. As the mass of material being dried or aerated at any one time is limited in amount, the resistance to air flow is kept low, thus avoiding excessive power consumption in moving the air. The gated ducts permit the air to be introduced into the forage mass in the container at different levels as needed and also permit proper aeration of the material regardless of the extent of filling of the container.

When air is introduced into the container from one of the higher side wall ducts 25 it is not always necessary to close the gates of the lower ducts, as the increased resistance to air flow in the lower parts of the material will limit the air flow therein and cause most of the air to flow into the container from the highest open duct.

After the loading operation is completed, the rotor 47 is lowered onto the top of the material, and when material is to be unloaded the gate or door 18 nearest the top of the material is opened, whereupon the rotor is rotated by the motor 45, causing a loosening of the material, if packed, and fanning the material into the discharge duct 17 where it falls into a suitable receptacle such as the cart 24.

The loading and discharging means for the forage material may also be embodied in similar forage container such as silos.

The discharging means forms subject-matter of my copending application for Forage Containers, Serial No. 146,121, filed February 17, 1950.

What I claim as new and desire to secure by Letters Patent is:

1. A forage container having side walls, a duct extending about said side walls, said side walls being apertured for admitting a gaseous drying medium into said container from said duct, means for causing the medium to flow under pressure into an end of said duct, and a normally closed movable closure for the other end of said duct, said closure when open permitting material deposited in said duct to be blown out by the gaseous pressure therein.

2. A forage container including a casing section of generally annular shape having side walls and having out-turned peripheral flanges, and a duct extending about said casing section and having connection flanges secured to said casing section peripheral flanges, said walls being apertured for admitting a gaseous drying medium under pressure into said container from said duct.

3. A forage container having side walls with vertically spaced peripheral flanges, and a channel-shaped duct member extending about said side walls and having upper and lower parts secured to said flanges, said duct member being adapted to receive therein a compressed gaseous drying medium, and said container side walls being apertured at said duct member to admit the gaseous drying medium into said container from said duct member.

FRANK N. G. KRANICK.

REFERENCES CITED

The following references are of record in the file of this patent:

UNITED STATES PATENTS

| Number | Name | Date |
|---|---|---|
| 334,987 | Shedd | Jan. 26, 1886 |
| 653,032 | McDaniel | July 3, 1900 |
| 857,098 | McNees | June 18, 1907 |
| 877,141 | Thompson | Jan. 21, 1908 |
| 936,011 | Meyer | Oct. 5, 1909 |
| 1,068,176 | Scott | July 22, 1913 |
| 1,184,385 | Schlafly | May 23, 1916 |
| 1,905,883 | Barstow et al. | Apr. 25, 1933 |
| 2,000,103 | Shodron | May 7, 1935 |
| 2,299,299 | Bills | Oct. 20, 1942 |